United States Patent
Büttner et al.

(10) Patent No.: US 12,027,926 B2
(45) Date of Patent: Jul. 2, 2024

(54) METHOD FOR PULLING A STATOR WINDING SYSTEM INTO A STATOR LAMINATION STACK

(71) Applicant: Innomotics GmbH, Nuremberg (DE)

(72) Inventors: Klaus Büttner, Hollstadt (DE); Tobias Katzenberger, Bad Königshofen STT Unteressfeld (DE); Klaus Kirchner, Ostheim (DE); Bastian Plochmann, Neustadt an der Aisch (DE); Matthias Warmuth, Windshausen (DE)

(73) Assignee: Innomotics GmbH, Nuremberg (DE)

( * ) Notice: Subject to any disclaimer, the term of this patent is extended or adjusted under 35 U.S.C. 154(b) by 661 days.

(21) Appl. No.: 17/276,740

(22) PCT Filed: Sep. 11, 2019

(86) PCT No.: PCT/EP2019/074168
§ 371 (c)(1),
(2) Date: Mar. 16, 2021

(87) PCT Pub. No.: WO2020/058048
PCT Pub. Date: Mar. 26, 2020

(65) Prior Publication Data
US 2022/0045583 A1  Feb. 10, 2022

(30) Foreign Application Priority Data

Sep. 17, 2018  (EP) .................................... 18194860

(51) Int. Cl.
H02K 15/06  (2006.01)
(52) U.S. Cl.
CPC ...... H02K 15/068 (2013.01); *Y10T 29/49009* (2015.01)

(58) Field of Classification Search
CPC .. H02K 15/068; H02K 15/062; H02K 15/085; H02K 15/045; Y10T 29/53143; Y10T 29/49009; F16C 2380/26
(Continued)

(56) References Cited

U.S. PATENT DOCUMENTS 2,743,508 A  5/1956 Isaacson
8,281,481 B2 * 10/2012 Shives ................ H02K 15/064
                                                29/598

(Continued)

FOREIGN PATENT DOCUMENTS

CN  1183665 A  6/1998
CN  1424803 A  6/2003
(Continued)

OTHER PUBLICATIONS

PCT International Search Report and Written Opinion of International Searching Authority dated Dec. 16, 2019 corresponding to PCT International Application No. PCT/EP2019/074168 filed Nov. 9, 2019.

*Primary Examiner* — Thiem D Phan
(74) *Attorney, Agent, or Firm* — Henry M. Feiereisen LLC

(57) ABSTRACT

Disclosed is a method for pulling a stator winding system of an electric machine into a stator lamination stack of the electric machine and to a winding tool, with the stator lamination stack having stator grooves which run parallel to a rotation axis of the electric machine and are distributed in a circle around the rotation axis and open thereto and which have on an end facing the rotation axis a gap region which is narrowed relative to the rest of the stator groove. Windings are arranged in the stator grooves, and winding overhangs, as seen in the direction of the rotation axis, protrude from the stator lamination stack at the two axial ends thereof, with the windings formed in the stator grooves as (Continued)

laid windings. The stator lamination stack has no guide structures on the two axial ends for guiding the individual turns of the windings.

4 Claims, 9 Drawing Sheets

(58) Field of Classification Search
USPC .................. 29/596, 598, 605, 606, 609, 732
See application file for complete search history.

(56) References Cited

U.S. PATENT DOCUMENTS

| | | | |
|---|---|---|---|
| 8,936,211 B2 * | 1/2015 | Yamaguchi | H02K 15/0037 |
| | | | 242/432.5 |
| 2003/0098379 A1 | 5/2003 | Stockman et al. | |
| 2005/0133655 A1 | 6/2005 | Hashimoto et al. | |
| 2009/0267441 A1 | 10/2009 | Hiramatsu et al. | |
| 2015/0048710 A1 | 2/2015 | Weller et al. | |

FOREIGN PATENT DOCUMENTS

| | | |
|---|---|---|
| CN | 1602576 A | 3/2005 |
| CN | 104247220 A | 12/2014 |
| DE | 961 008 C | 3/1957 |
| DE | 102005002364 A1 | 7/2006 |
| DE | 10 2014 009 799 A1 | 1/2016 |
| JP | 2009195008 A | 8/2009 |
| KR | 101357676 B1 | 2/2014 |
| KR | 101864075 B1 | 6/2018 |
| WO | WO 2018041836 A1 | 3/2018 |

* cited by examiner

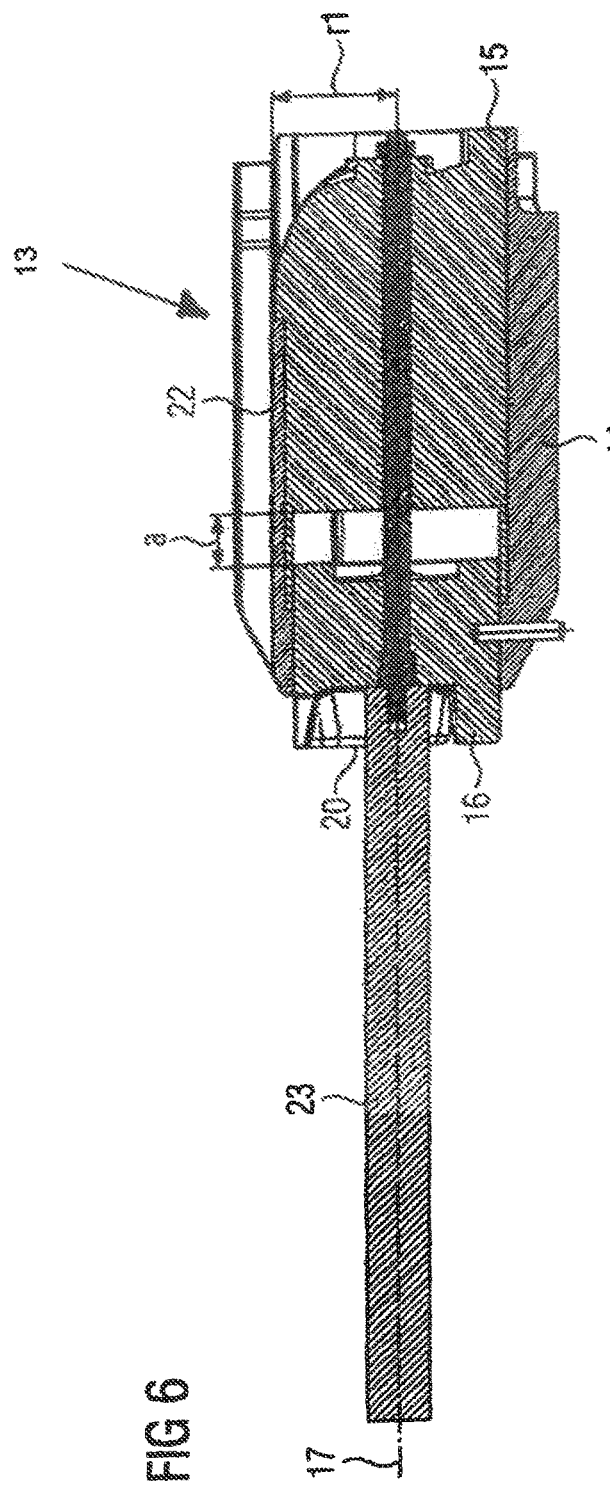
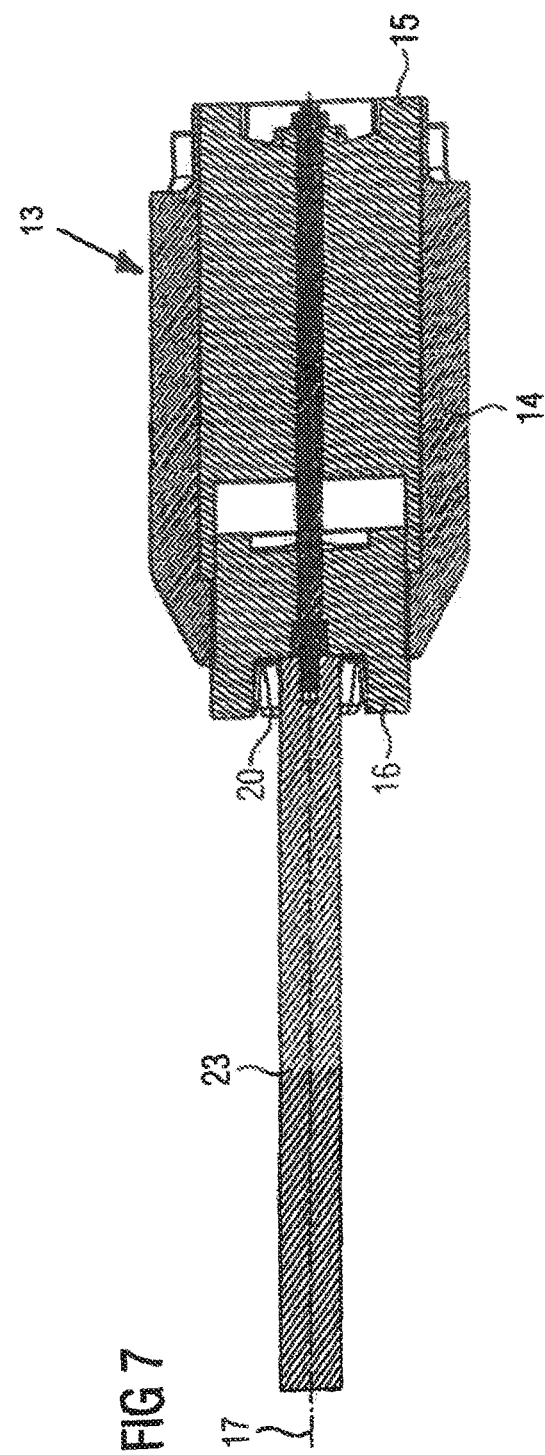
FIG 6
FIG 7

METHOD FOR PULLING A STATOR WINDING SYSTEM INTO A STATOR LAMINATION STACK

CROSS-REFERENCES TO RELATED APPLICATIONS

This application is the U.S. National Stage of International Application No. PCT/EP2019/074168, filed Sep. 11, 2019, which designated the United States and has been published as International Publication No. WO 2020/058048 A1 and which claims the priority of European Patent Application, Serial No. 18194860.5, filed Sep. 17, 2018, pursuant to 35 U.S.C. 119(a) (d).

BACKGROUND OF THE INVENTION

The present invention is based on a method for pulling a stator winding system of an electric machine into a stator lamination stack of the electric machine,
wherein the stator lamination stack has a number of stator slots which run parallel to an axis of rotation of the electric machine, are disposed in a circularly distributed manner about the axis of rotation and are open toward the axis of rotation, but have at their end facing the axis of rotation a gap region which is tapered relative to the rest of the stator slot.

The present invention further relates to a winding tool for a stator winding system of an electric machine.

An electric machine comprises, among other things, a stator which is usually designed as a laminated core stack. In the usual design of the electric machine as a rotary electric machine having an internal rotor, the stator slots are open in the radially inward direction, i.e. toward the axis of rotation. However, at least at their radially inner end the stator slots have a gap region that is tapered relative to the rest of the stator slot. From a purely electromagnetic perspective, the stator slot should taper as much as possible. For manufacturing reasons, however, a sufficiently large slot width must remain, since otherwise the windings of the stator winding system could not be inserted into the stator slots.

Various procedures are known for manufacturing the windings of the stator winding system and inserting the windings into the stator lamination stack.

For example, it is known to wind the turns of the windings (i.e. the individual conductor loops of the windings) onto a former and then insert the windings into the stator slots via the slot gaps. In this procedure, only one of the winding overhangs is held in a defined manner. The main portion of the windings and the other winding overhang lie in an uncontrolled manner outside the former. However, when the respective winding is pulled into the respective stator slot, a defined arrangement of the individual turns cannot be guaranteed. Instead, a so-called jumble winding is produced, entailing crossovers of the individual turns. On the one hand, this results in a reduced fill factor in the stator slot. On the other hand, it can result in increased electrical voltages between turns disposed adjacent to one another in the respective stator slot. In addition, high forces are required for pulling in. In individual cases, it is even possible that the wire insulation of the turns will be weakened or damaged. Efforts to make the surfaces of the turns smoother by means of coatings and thus reduce the frictional forces have proved unsuccessful. In particular, they have the disadvantage that the impregnation of the stator is significantly impaired. Such an approach is known, for example, from DE 961 008 B.

With a so-called layer winding, a defined arrangement of the individual turns is achieved. In particular, the individual turns lie parallel to one another. On the one hand, this allows the fill factor of the stator slot to be maximized. On the other hand, electrical voltages between turns disposed adjacent to one another in the respective stator slot can be minimized. However, to achieve layer windings in the stator slots, in the prior art it is necessary to wind the individual turns directly into the stator lamination stack by means of a needle winder. This is considerably more complex and expensive.

U.S. Pat. No. 2,743,508 A discloses a method for pulling a stator winding system of an electric machine into a stator lamination stack of the electric machine, wherein the stator lamination stack has a number of stator slots which run parallel to an axis of rotation of the electric machine, are disposed in a circularly distributed manner about the axis of rotation and are open toward the axis of rotation, but have, at their end facing the axis of rotation, a gap region which is tapered relative to the rest of the stator slot. In this method, the windings of a number of phases of the stator winding system are wound onto a winding tool, wherein the winding tool has tool slots at least for the windings of a number of phases. The tool slots extend to a tool axis of the winding tool, are distributed circularly about the tool axis and are closed toward the tool axis. They are part of a shell section of the winding tool.

SUMMARY OF THE INVENTION

The object of the present invention is to create possibilities whereby the disadvantages of the prior art can be avoided in a simple, reliable and, moreover, cost-effective manner. This object is primarily achieved by a pulling-in method as set forth hereinafter. Advantageous embodiments of the pulling-in method are set forth in dependent claims.

According to the invention, a pulling-in method is created,
wherein the windings of a number of phases of the stator winding system are wound onto a winding tool,
wherein the winding tool has tool slots at least for the windings of a number of phases,
wherein the tool slots run parallel to a tool axis of the winding tool, are disposed in a circularly distributed manner about the tool axis and are closed toward the tool axis,
wherein the tool slots are part of a shell section of the winding tool,
wherein the winding tool also comprises a first and a second end part, which,
viewed radially with respect to the tool axis, are disposed completely within the shell section and, guided by the shell section, are displaceable in the shell section in the direction of the tool axis,
wherein the two end parts, viewed in the direction of the tool axis, are displaceable relative to one another by a shortening section so that, viewed in the direction of the tool axis, they are displaceable between a smaller and a larger distance from one another,
wherein the windings of the number of phases are wound onto the winding tool as layer windings while the two end parts have the greater distance from one another,
wherein, during winding of the windings, the subsequent winding overhangs of the windings are held radially within the shell element section by guide surfaces of the end parts,
wherein, in a transition section from the sections of the windings disposed in the tool slots to the winding overhangs held by the first end part, the windings are guided by guide elements of the first end part in such a way that, viewed in the tangential direction about the tool axis, they extend over a smaller angle than in the region of the shell section, wherein the winding tool with the windings wound thereon is disposed in such a way that the tool axis is aligned with the axis of rotation, the tool slots are located at the same positions in the radial direction and tangential direction as those of the stator slots into which the windings wound on the winding tool are to be inserted, and the first end part projects into the stator lamination stack, wherein in this state the end parts are displaced in the direction of the tool axis, wherein the two end parts are first displaced relative to each other so that they are at the smaller distance from each other after the displacement, and during the displacement of the two end parts relative to each other the second end part detaches from the winding overhangs wound onto the second end part, wherein the first end part is then pushed through the stator lamination stack in the direction of the axis of rotation and by the pushing of the end parts the windings are pulled into the corresponding stator slots as layer windings, wherein, during the pulling-in process, the windings are positioned with their transition sections in the gap regions of the stator slots, and the winding overhangs detached from the second end part are guided radially outward by guide bevels on the shell section and then slide radially outward along the shell section onto the stator lamination stack, wherein, with or without the two end parts being placed to the greater distance from each other, the first end part is retracted through the stator lamination stack, wherein the first end part detaches from the winding overhangs wound on the first end part before or during retraction, wherein the winding overhangs detached from the first end part are bent radially outward.

As a result, the windings are initially applied to the winding tool radially from outside during the manufacture of the windings as such. The manufacture of layer windings is thus easily possible. Pulling into the stator lamination stack is also possible in a simple manner. It is merely necessary to ensure that the tool slots of the winding tool correspond in arrangement and shape to the stator slots of the stator lamination stack. They are, so to speak, the like counterparts to the stator slots, except that they are open radially outward and not radially inward. In the region of the slot gaps, the windings are tapered to match the width of the slot gaps, so that the windings can also be guided without difficulty in the region of the slot gaps.

In a preferred embodiment, the guide surfaces of the first end part are mounted in an axially displaceable manner in a base element of the first end part so that they can be displaced between a first position in which they project axially from the base element as viewed in the direction of the tool axis, and a second position in which they are retracted into the base element as viewed in the direction of the tool axis. This makes it possible to move the guide surfaces from the first to the second position after the first end part has been pushed through the stator lamination stack, thereby releasing the winding overhangs there even before the first end part is retracted from the first end part so that they can be bent radially outward.

In a particularly preferred embodiment, sliding elements are also mounted in a radially displaceable manner in the base element so that they can be displaced between a first position, in which they are retracted into the base element as viewed orthogonally to the tool axis, and a second position in which they project radially out of the base element as viewed orthogonally to the tool axis. In this case, it is possible to bend the winding overhangs initially wound onto the guide surfaces of the first end element radially outward by means of the sliding elements.

It is conceivable for the windings of a plurality of phases to be applied to the winding tool and the windings of this plurality of phases to be inserted simultaneously into the stator lamination stack. However, pulling the windings into the stator lamination stack can be considerably simplified by winding only the windings of a single phase of the stator winding system onto the winding tool at a time and by performing the inventive pulling-in process repeatedly until the windings of all the phases of the stator winding system have been pulled into the stator lamination stack.

The object is also achieved by a winding tool as set forth hereinafter. Advantageous embodiments of the winding tool are set forth in dependent claims.

According to the invention, a winding tool is created, wherein the winding tool has tool slots at least for the windings of a number of phases of the stator winding system, wherein the tool slots run parallel to a tool axis of the winding tool, are disposed in a circularly distributed manner about the tool axis and are closed toward the tool axis, wherein the tool slots are part of a shell section of the winding tool, wherein the winding tool also comprises a first and a second end part, which, viewed radially with respect to the tool axis, are disposed completely within the shell section and, guided by the shell section, are displaceable in the shell section in the direction of the tool axis, wherein the two end parts, viewed in the direction of the tool axis, are displaceable relative to each other by a shortening section so that, viewed in the direction of the tool axis, they are displaceable between a smaller and a larger distance from each other, wherein the end parts have guide surfaces by means of which the subsequent winding overhangs of the windings are held radially within the shell section during winding of the windings, wherein the first end part has guide elements by means of which the windings are guided in a transition section from the sections of the windings disposed in the tool slots to the winding overhangs held by the first end part in such a way that, viewed in the tangential direction about the tool axis, they extend over a smaller angle than in the region of the shell section, wherein disposed on the shell section are guide bevels through which the winding overhangs wound onto the second end part are guided radially outward after detachment from the second end part so that they can then slide radially outward along the shell section onto the stator lamination stack.

In a preferred embodiment, the guide surfaces of the first end part are mounted in an axially displaceable manner in a base element of the first end part so that they can be displaced between a first position, in which they project axially from a base element of the first end part as viewed in the direction of the tool axis, and a second position in which they are retracted into the base element as viewed in the direction of the tool axis. This makes it possible to move the guide surfaces from the first to the second position after the first end part has been pushed through the stator lamination stack, thereby releasing the winding overhangs there even before the first end part is retracted from the first end part so that they can be bent radially outward.

In a particularly preferred embodiment, sliding elements are additionally mounted in a radially displaceable manner in the base element so that they can be displaced between a first position, in which they are retracted into the base element as seen orthogonally to the tool axis, and a second position, in which they project radially out of the base element as seen orthogonally to the tool axis. In this case, it is possible to bend the winding overhangs initially wound onto the guide surfaces of the first end element radially outward by means of the sliding elements.

In a preferred embodiment of the winding tool, the tool slots, viewed from the tool axis in the tangential direction, are located in predetermined first angular regions between which there are second angular regions in which no tool slots are disposed. In this case, the second angular regions are larger than the first angular regions. This embodiment ensures that only the windings of a single phase of the stator winding system can be wound on the winding tool in each case. This makes it considerably easier to pull the windings into the stator lamination stack.

BRIEF DESCRIPTION OF THE DRAWING

The above described characteristics, features and advantages of the present invention, as well as the manner in which they are achieved, will become clearer and more readily comprehensible in connection with the following description of the exemplary embodiments which will be explained in more detail in conjunction with the associated schematic drawings in which:

FIG. 6 shows a section through the winding tool of FIG. 4 along a line VI-VI in FIG. 5, FIG. 7 shows a section through the winding tool of FIG. 4 along a line VII-VII in FIG. 5.

DETAILED DESCRIPTION OF PREFERRED EMBODIMENTS

Figure 1:
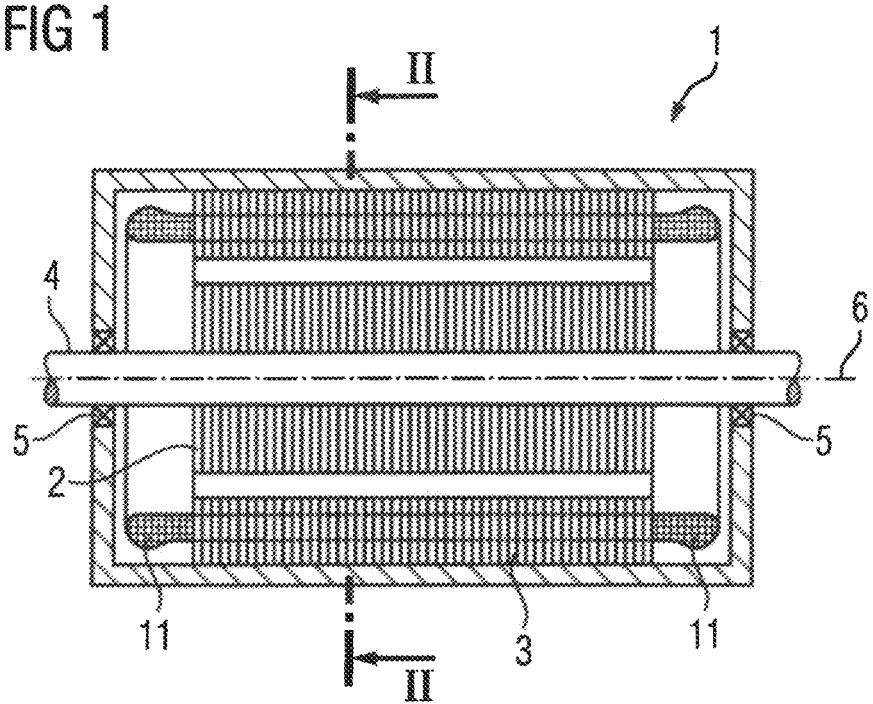
FIG. 1 shows a longitudinal section through an electric machine.

According to FIG. 1, a rotary electric machine 1 has a rotor 2 and a stator lamination stack 3. The rotor 2 is disposed on a rotor shaft 4. The rotor shaft 4 is mounted in bearings 5 so that the rotor shaft 4 is rotatable about an axis of rotation 6.

Where the terms "axial", "radial" and "tangential" are used below in relation to the axis of rotation 6, axial means a direction parallel to the axis of rotation 6. Radial means, in relation to the axis of rotation 6, a direction orthogonal to the corresponding axial direction directly toward or away from the axis of rotation 6. Tangential is, with respect to the axis of rotation 6, a direction that is both orthogonal to the corresponding axial direction and orthogonal to the corresponding radial direction. Tangential is therefore a direction which—insofar as it is related to the axis of rotation 6—extends circularly about the axis of rotation 6 at a constant axial position and at a constant radial distance from the axis of rotation 6.

Figure 2:
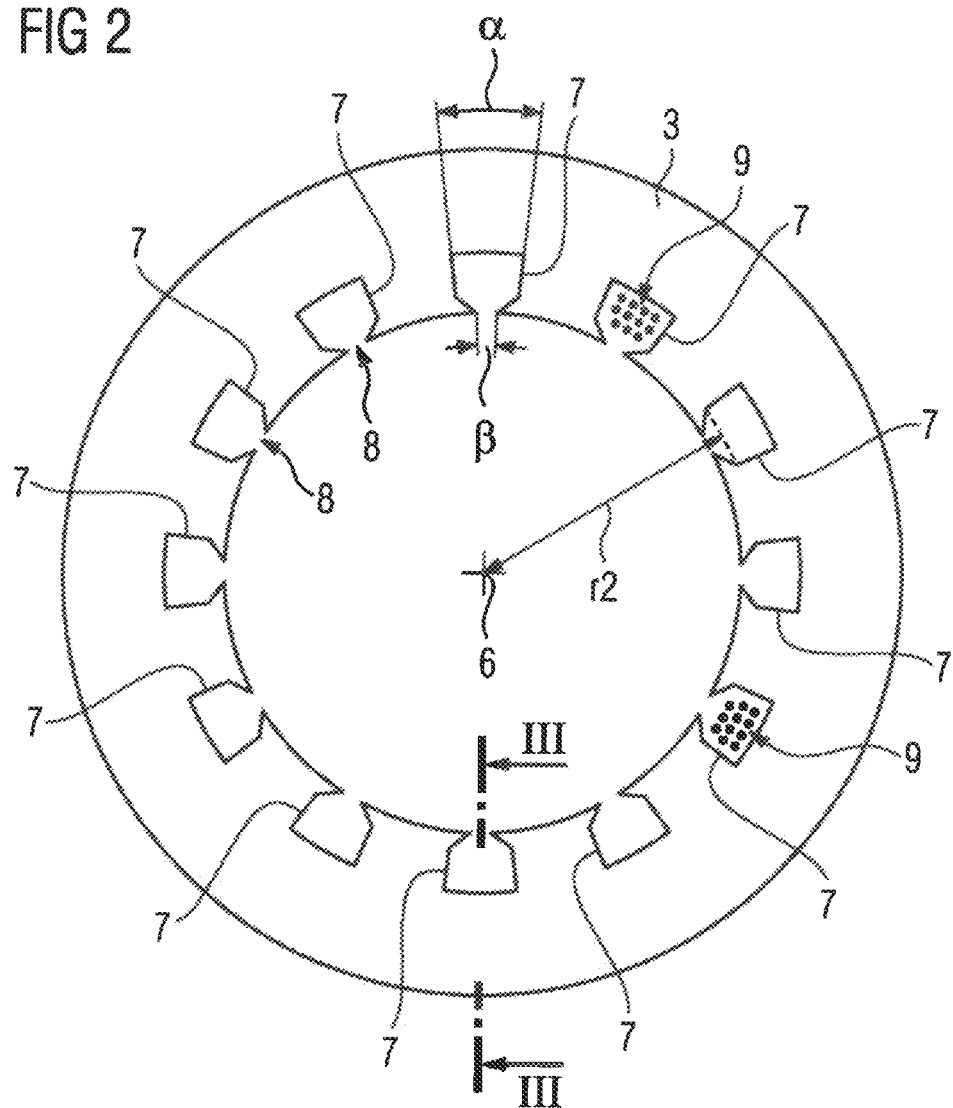
FIG. 2 shows a section through the electric machine from FIG. 1 according to a line II-II in FIG. 1.
Figure 3:
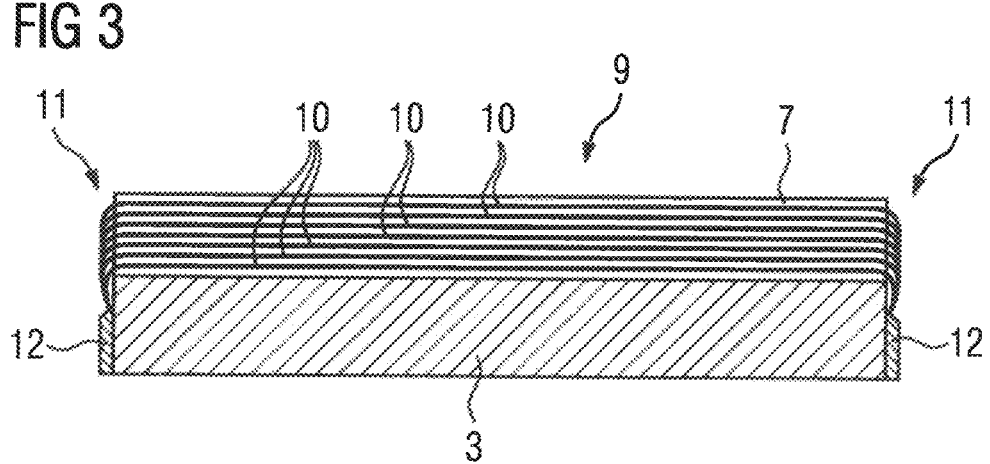
FIG. 3 shows a section through the electric machine of FIGS. 1 and 2 along a line III-III in FIG. 2.
Figure 4:
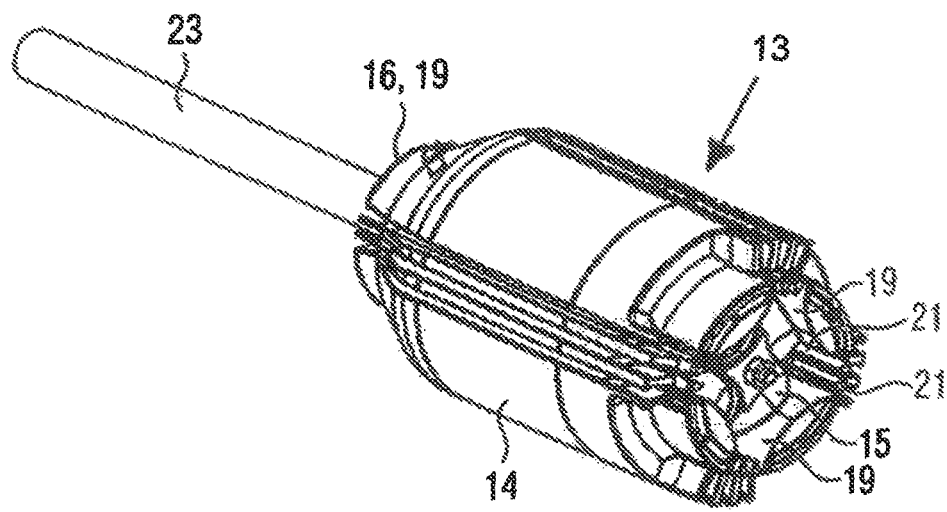
FIG. 4 shows a perspective view of a winding tool.
Figure 5:
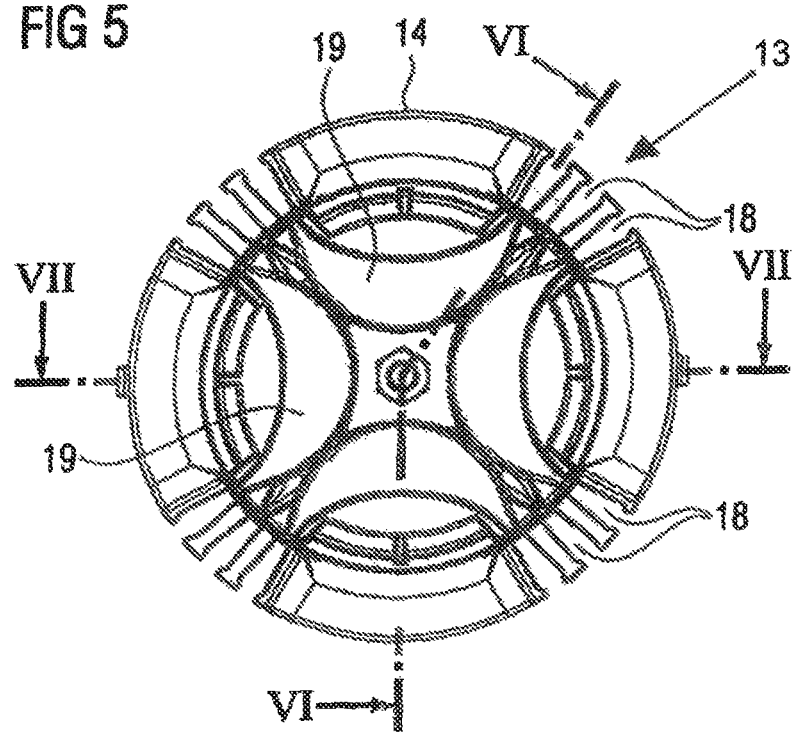
FIG. 5 shows a front view of the winding tool of FIG. 4.

The stator lamination stack 3 has—see in particular FIGS. 2 and 3—a number of stator slots 7. The stator slots 7 run parallel to the axis of rotation 6 of the electric machine 1. They are disposed in a circularly distributed manner about the axis of rotation 6. Toward the axis of rotation 6—i.e. radially inward—the stator slots 7 are open. The stator slots 7 each extend in the tangential direction over an angle α, hereinafter referred to as the first slot angle. At their end facing the axis of rotation 6, however, the stator slots 7 taper. In this tapered region 8—hereinafter referred to as the gap region—the stator slots 7 only extend over an angle β, hereinafter referred to as the first gap angle. The first gap angle β is smaller than the first slot angle α.

The windings 9 of a stator winding system are disposed in the stator slots 7. However, in FIG. 2 this is shown for only one pair of stator slots 7. The main portions of the windings 9 are disposed in the stator slots 7. Winding overhangs 11 of the windings 9 project beyond the stator lamination stack 3 at the two axial ends of the stator lamination stack 3, as shown in FIG. 1.

The individual turns 10 of one of the windings 9 are visible in FIG. 3. The windings 9 in the stator slots 7 are shown to be implemented as layer windings. The individual turns 10 thus run parallel in the stator slots 7 and without crossing one another.

As illustrated in FIGS. 1 to 3, at its two axial ends the stator lamination stack 3 has no guide structures by means of which the individual turns 10 of the windings 9 could be guided. In particular, the stator lamination stack 3 itself has no such guide structures. If end plates 12 were to be placed on the two axial ends of the stator lamination stack 3 according to the illustration in FIG. 3, no such guide structures are present on the end plates 12 either.

The manner in which the windings 9 can be inserted into the stator lamination stack 3 as layer windings even though there are no guide structures for the individual turns 10 of the windings 9 at the axial ends of the stator lamination stack 3 will now be explained in detail. In particular, the present invention relates to a pulling-in method for the stator winding system, i.e. a method by means of which the stator winding system is pulled into the stator lamination stack 3. The present invention further relates to a winding tool 13 required for this purpose, which will be explained in more detail below with reference to FIGS. 4 to 7.

As shown in FIGS. 4 to 7, the winding tool 13 essentially comprises three parts, namely on the one hand a shell section 14 and on the other hand a first and a second end part 15, 16. The winding tool 13 is also essentially rotationally symmetrical with respect to a tool axis 17.

Where the terms "axial", "radial" and "tangential" are used in the following with reference to the tool axis 17, axial means a direction parallel to the tool axis 17. Radial, in relation to the tool axis 17, means a direction orthogonal to the corresponding axial direction directly toward or away from the tool axis 17. Tangential, with respect to the tool axis 17, is a direction that is both orthogonal to the corresponding axial direction and orthogonal to the corresponding radial direction. Tangential is therefore a direction which—in relation to the tool axis 17—extends circularly about the tool axis 17 at a constant axial position and at a constant radial distance from the tool axis 17.

The winding tool 13 has slots 18 at least for the windings 9 of a number of phases of the stator winding system. These slots 18 will be referred to hereinafter as tool slots to differentiate them linguistically from the stator slots 7. The tool slots 18 run parallel to the tool axis 17. They are disposed in a circularly distributed manner about the tool axis 17 and are closed toward the tool axis 17—i.e. radially inward. They are open radially outward. The tool slots 17 are part of the shell section 14.

The first and second end parts 15, 16 are disposed completely inside the shell section 14 viewed radially with respect to the tool axis 17. However, they can project beyond the shell section 14 in the axial direction. The two end parts 15, 16 are axially displaceable in the shell section 14. They are guided by the shell section 14. The two end parts 15, 16 can also be displaced relative to one another in the axial direction by a shortening section, so that, viewed in the direction of the tool axis 17, they can be displaced between a smaller distance and a larger distance a from one another. For example, the larger distance a can be as shown in FIGS. 6 and 7, while the smaller distance is 0, so that the first and second end parts 15, 16 abut one other in this state. The state in which the two end parts 15, 16 have the larger distance a from each other is a static state. The static state is the state assumed when no external forces are acting on the two end parts 15, 16. It can be defined, for example, by a spring device not shown in the FIGS.

Before the windings 9 are pulled into the stator lamination stack 3, the windings 9 of a number of phases of the stator winding system are first wound onto the winding tool 13. During the winding of the windings 9 onto the winding tool 13, the two end parts 15, 16 have the greater distance a from one another. Moreover, the windings 9 of the number of phases are wound onto the winding tool 13 as layer windings. The turns 10 of the windings 9 are thus laid next to and on top of each other in a defined manner during winding, so that the individual turns 10 run parallel to each other in the region of the tool slots 18. This can be easily achieved because the tool slots 18 are open radially outward.

As already mentioned, the end parts 15, 16 are disposed radially inside the shell section 14. They have guide surfaces 19, 20. By means of the guide surfaces 19, 20, the subsequent winding overhangs 11 are held radially within the shell section 14 during winding of the windings 9. At least the first end part 15 also has guide elements 21. By means of the guide elements 21, the windings 9 are guided in a transition section in such a way that, viewed in the tangential direction around the tool axis 17, they extend over a smaller angle γ than in the region of the shell section 14. The transition section is the section of the windings 9 between the sections of the windings 9 disposed in the tool slots 18 and the winding overhangs 11 disposed in the first end part 15.

The sections of the windings 9 disposed in the region of the shell section 14 may in particular extend over an angle—hereinafter referred to as the second slot angle—which is as large as the first slot angle α. The angle γ—hereinafter referred to as the second gap angle—must, on the other hand, be no greater than the first slot angle β.

Figure 8:
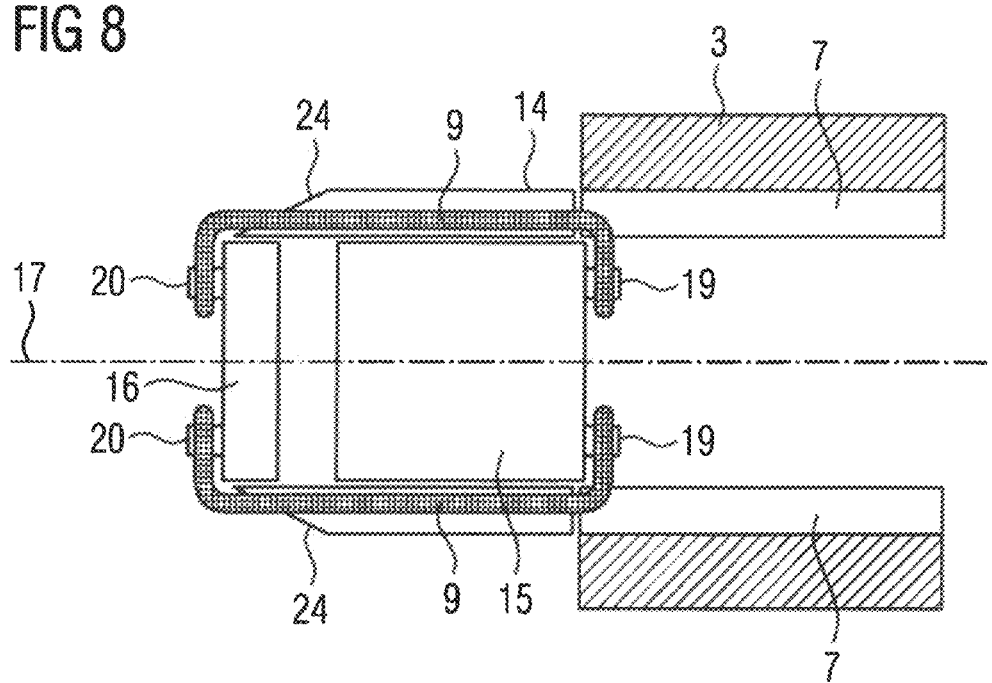
FIG. 8 shows stator lamination stack with winding tool attached.

The winding tool 13 is designed such that the tool slots 18—this applies both to the individual tool slots 18 as such and to the distribution of the tool slots 18—are virtually a mirror image of the stator slots 7. In particular—see FIG. 6—a radial distance r1 of the slot base 22 of the tool slots 18 from the tool axis 17 can correspond to a radial distance r2—see FIG. 2—at which the tapering of the stator slots 7 begins. The matching of the slot angle α and the gap angle β has already been referred to. After the windings 9 have been wound onto the winding tool 13, the winding tool 13—obviously with the windings 9 wound thereon—can therefore be disposed in such a way that the tool axis 17 is aligned with the axis of rotation 6 and the tool slots 18 are located in the same positions in the radial direction and tangential direction as those of the stator slots 7 into which the windings 9 wound on the winding tool 13 are to be inserted. For example, a robot can grip a plunger 23 and place the winding tool 13 on the stator lamination stack 3 in this manner. In this state, the first end part 15 projects into the stator lamination stack 3. FIG. 8 shows this state.

Figure 9:
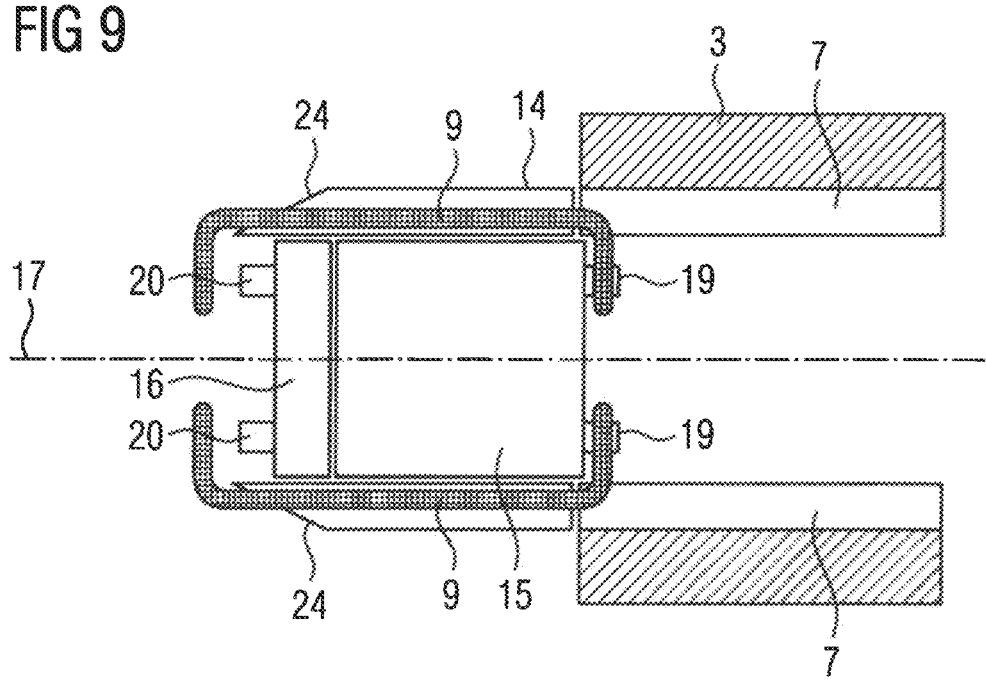
FIG. 9 shows a subsequent state of FIG. 8.

Starting from this state, the end parts 15, 16 are now axially displaced—e.g. via the plunger 23. First, the second end part 16 is displaced toward the first end part 15 without the first end part 15 moving. This displacement continues until the two end parts 15, 16 are the smaller distance apart. This state is shown in FIG. 9. During the displacement of the second end part 16 toward the first end part 15, the second end part 16 detaches from the winding overhangs 11 wound onto the second end part 16 as illustrated in FIG. 9. In particular, the second end part 16 penetrates into the shell section 14 until it no longer protrudes beyond the shell section 14 not only radially but also axially. The guide surfaces 20 of the second end part 16 can therefore no longer retain the winding overhangs 11 previously wound onto the second end part 16. These winding overhangs 11 thus follow subsequent actions affecting the winding overhangs 11.

Figure 10:
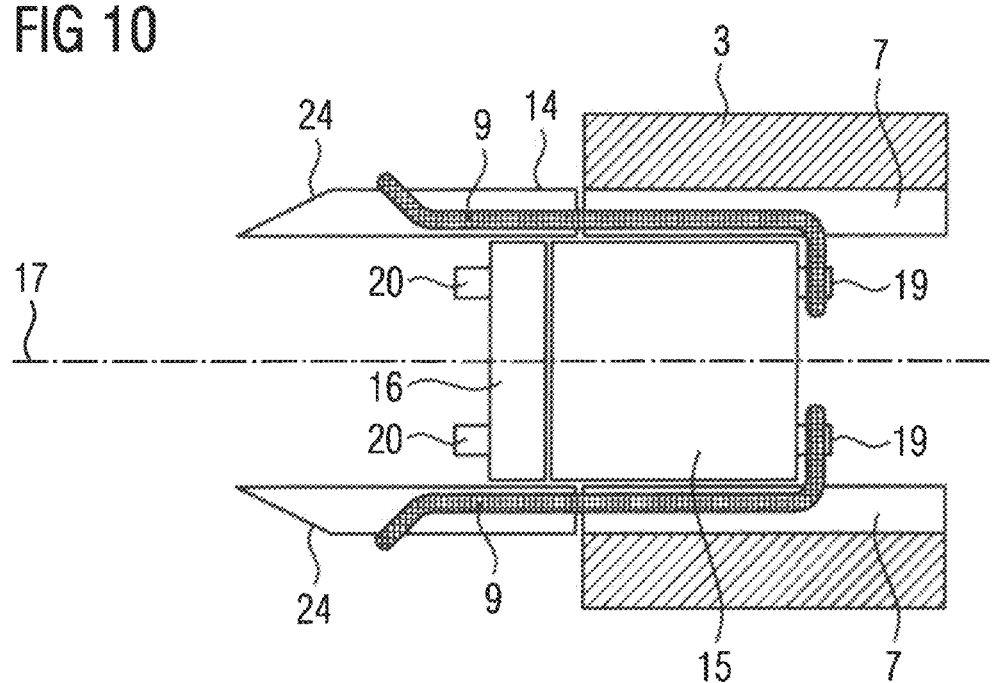
FIG. 10 shows a subsequent state of FIG. 9.

The first end part 15 is now pushed axially through the stator lamination stack 3. The second end part 16 follows this movement at a corresponding distance. FIG. 10 shows an intermediate state during this process, FIG. 11 the final state in which the first end part 15 has been pushed completely through the stator lamination stack 3.

By pushing the first end part 15 through, the transition sections of the windings 9 are guided in the axial direction along the gap regions of the stator slots 7. The main sections of the windings 9 follow this movement, but are directly drawn axially into the stator slots 7. In this process (and by this means) the layer winding is preserved. In addition, guide bevels 24 are disposed on the shell section 14 in the region facing away from the stator lamination stack 3. The winding overhangs 11 detached from the second end part 16 are—see FIG. 10—guided radially outward by the guide bevels 24 by the pushing of the end parts 15, 16. They can therefore then—see FIG. 11—slide radially outwards along the shell section 14 toward the stator lamination stack 3.

Figure 11:
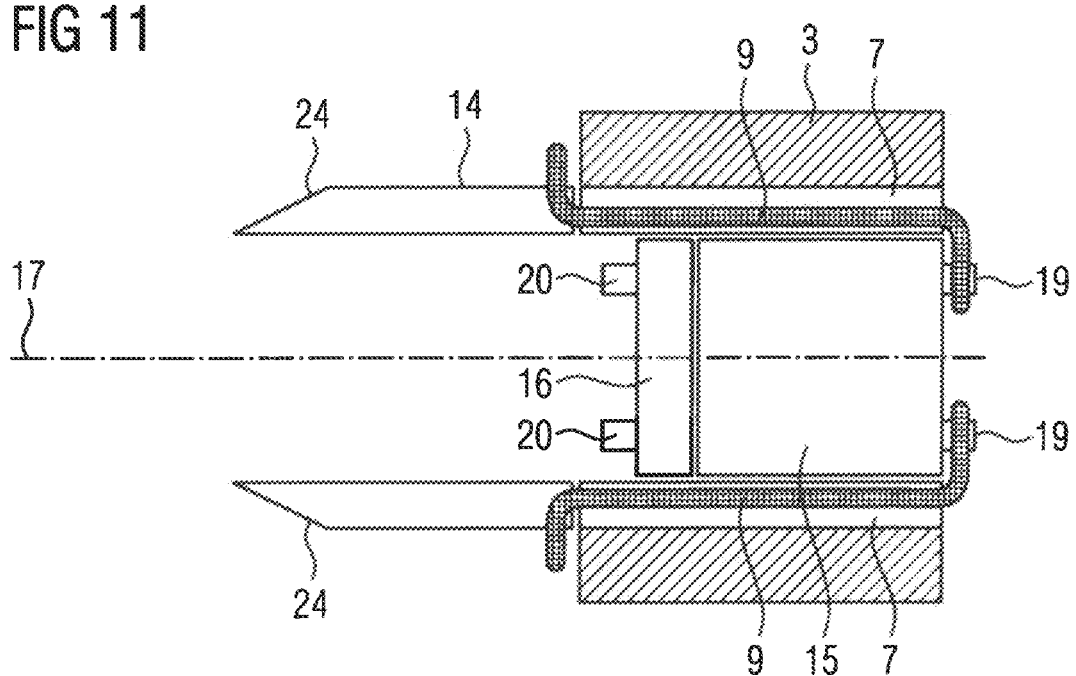
FIG. 11 shows a subsequent state of FIG. 10.
Figure 12:
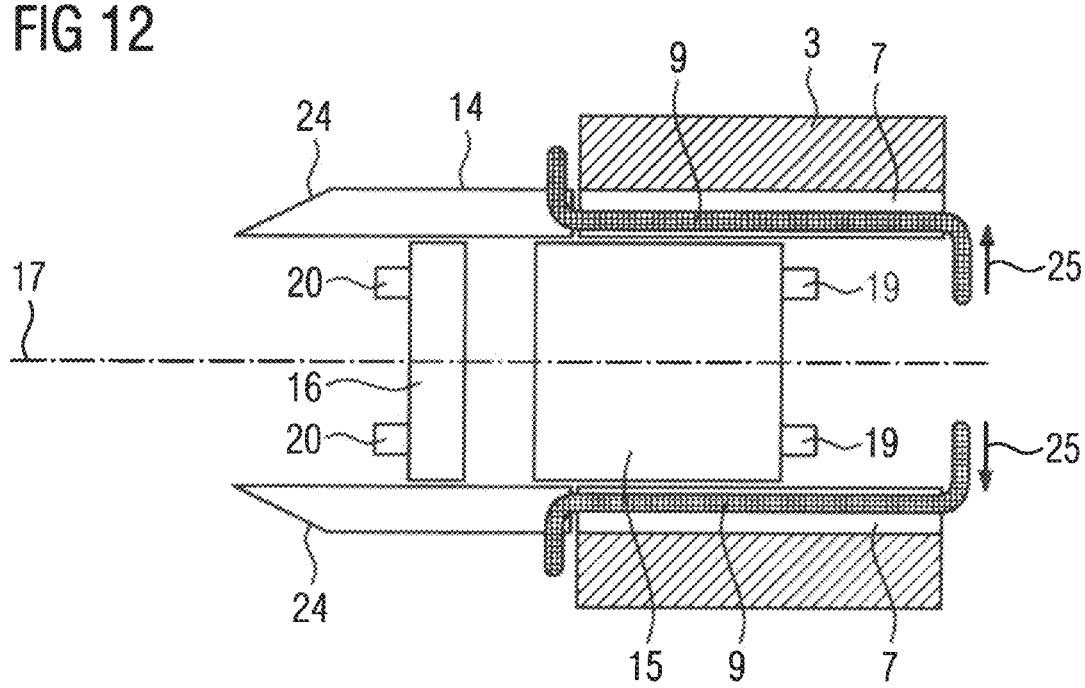
FIG. 12 shows a subsequent state of FIG. 11.

Starting from the state shown in FIG. 11, the first end part 15 is then retracted through the stator lamination stack 3 as shown in FIG. 12. As a rule, the two end parts 15, 16 are returned to the greater distance a from each other at the start of retraction. However, this is of secondary importance. The decisive factor is that, as illustrated in FIG. 12, during the retraction the first end part 15 becomes detached from the winding overhangs 11 wound onto the first end part 15. Consequently, it is possible to bend the winding overhangs 11, which have been released from the first end part 15, radially outward. The bending process is indicated in FIG. 12 by arrows 25. If necessary, additional fixing of the winding overhangs 11 detached from the first end part 15 can also take place. Both the bending process and any necessary fixing can be carried out in a conventional manner and does not therefore need to be explained in detail.

It now only remains for the winding overhangs 11 which have been detached from the second end part 16 to be bent completely over and—if necessary—fixed. Here, too, both the bending process and any fixing necessary can be carried out in a conventional manner and therefore need not be explained in detail. With this final operation, the windings 9 previously wound onto the winding tool 13 are completely inserted into the stator lamination stack 3.

A possible embodiment of the winding tool 13 and an embodiment of the pulling-in method based on this embodiment will now be explained in conjunction with FIGS. 13 to 15. Unless differences are expressly referred to below, both the winding tool 13 and the pulling-in method are consistent with the previously explained embodiment of the winding tool 13 and the previously explained embodiment of the pulling-in method.

Figure 13:
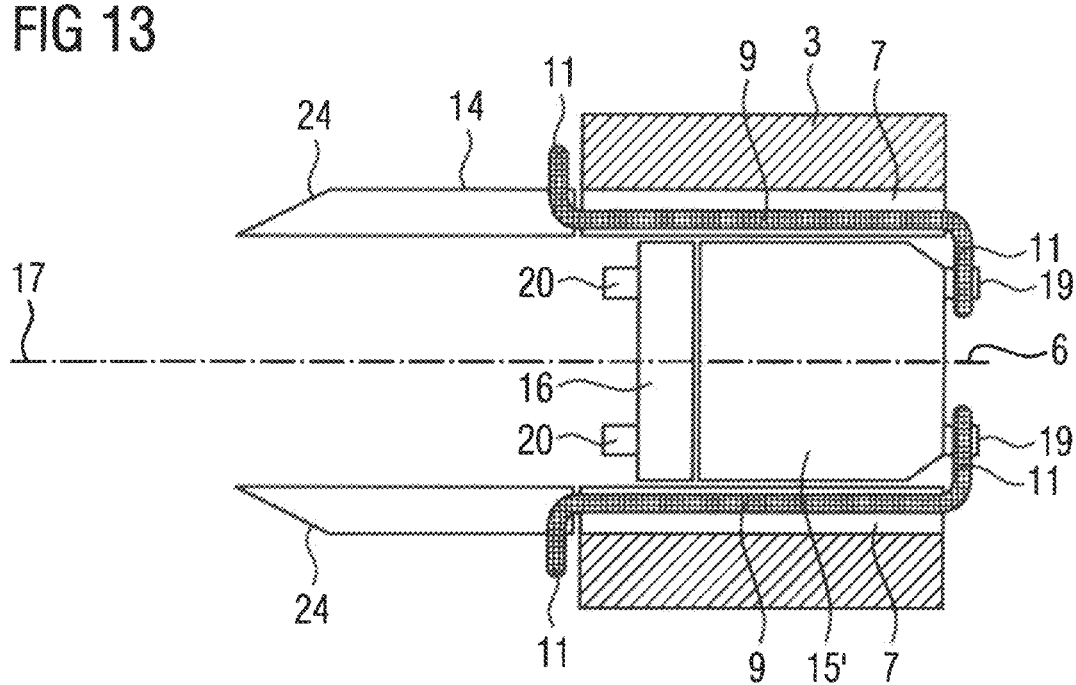
FIG. 13 shows a state similar to FIG. 11.
Figure 14:
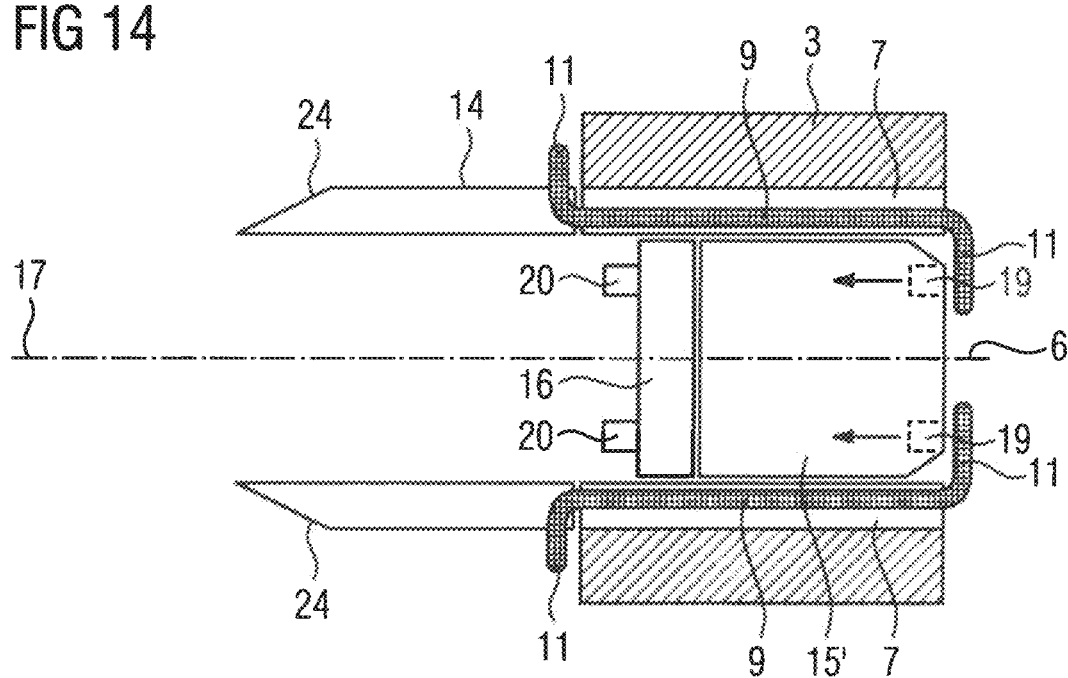
FIG. 14 shows a subsequent state of FIG. 13.
Figure 15:
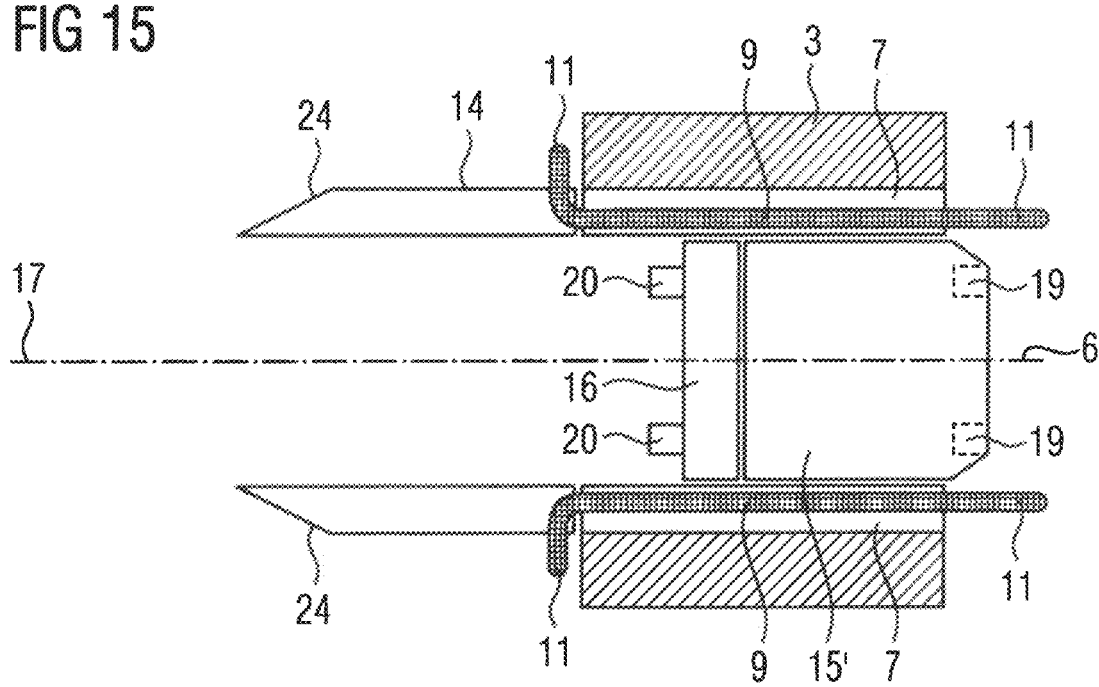
FIG. 15 shows a subsequent state of FIG. 14.

In the embodiment of the winding tool according to FIGS. 13 to 15, the guide surfaces 19 of the first end part 15 are not fixedly disposed but are mounted in an axially displaceable manner in a base element 15' of the first end part 15. In particular, they are thereby axially displaceable between a first position and a second position. The first position is shown in FIG. 13, the second position in FIGS. 14 and 15. In the first position, the guide surfaces 19 project axially from the base element 15'. In the second position, the guide surfaces 19 are retracted into the base element 15'. The same procedure may be possible in respect of the guide elements 21.

In the first position, the winding of the windings 9 and the insertion of the winding tool 13 into the stator lamination stack 3 take place, i.e. the sequence as shown in FIGS. 8 to 11. FIG. 13 shows this state. However, in contrast to the previously explained embodiment, the guide surfaces 19 (and possibly also the guide elements 21) are now moved to the second position as illustrated in FIG. 14. As a result, the first end part 15 is already detached from the winding overhangs 11 wound onto the first end part 15 prior to retraction. These winding overhangs 11 can therefore be bent over radially outward from this point onwards. As illustrated in FIG. 15, it is even possible to guide the first end part 15 even further through the stator lamination stack 3 after the guide surfaces 21 have been retracted, this axial movement of the first end part 15 causing these winding overhangs 11 to be bent completely or partially radially outward. Only then is the first end part 15 retracted through the stator lamination stack 3.

Figure 16:
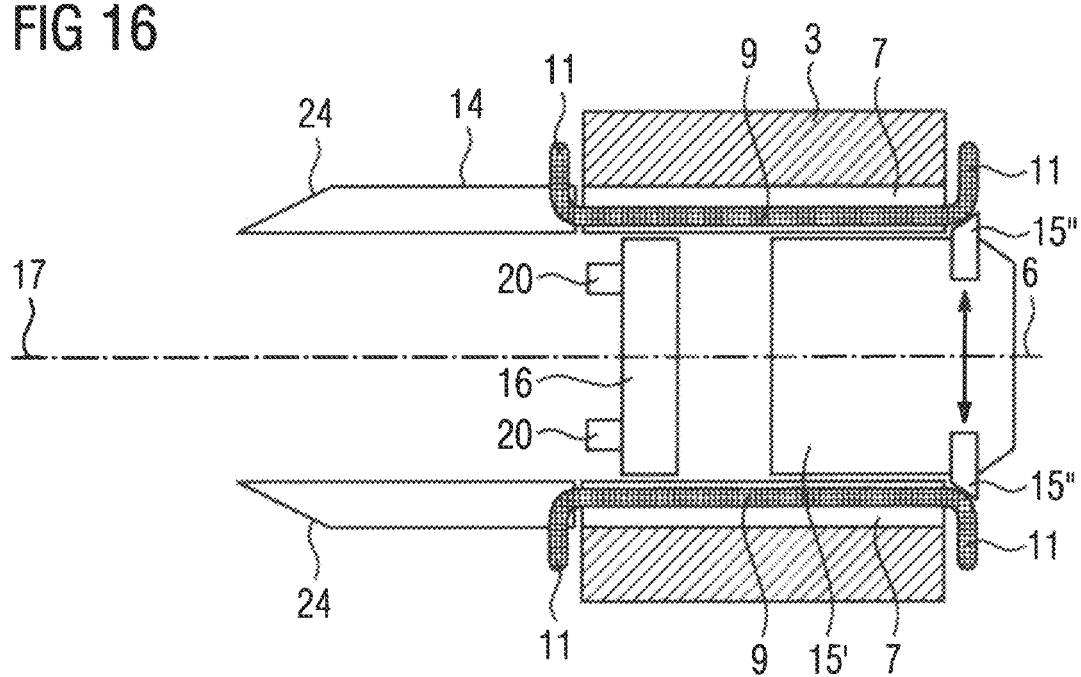
FIG. 16 shows a possible subsequent state of FIG. 15.

In addition, it is possible for sliding elements 15" to be disposed in the base body 15' as shown in FIG. 16. In this case, the sliding elements 15" are mounted in a radially displaceable manner so that they can be displaced between a first position and a second position. In the first position, the sliding elements 15" are retracted so that they do not project beyond the base element 15' in the radial direction. In this position, the winding of the windings 9 and the insertion of the winding tool 13 into the stator lamination stack 3 take place, i.e. the sequence up to and including FIG. 15. The sliding elements 15" are now moved to the second position. In this position, the sliding elements 15" project from the base element 15' as seen in the radial direction according to the illustration in FIG. 16. It is thus possible, as shown in FIG. 16, to bend the corresponding winding overhangs 11 radially outward by means of the sliding elements 15".

In principle, it is possible to insert all the phases of the stator winding system into the stator lamination stack 3 at the same time. Preferably, however, only the windings 9 of a single phase of the stator winding system are wound onto the winding tool 13 at a time. In this case, the pulling-in procedure is—self-evidently—carried out repeatedly until the windings 9 of all the phases of the stator winding system have been pulled into the stator lamination stack 3. This embodiment of the pulling-in process not only has manufacturing advantages, but also confers design advantages for the winding tool 13. In particular, it suffices in this case for the tool slots 18 to be located tangentially only in predetermined first angular regions 26, with second angular regions 27 in which no tool slots are disposed being located between the first angular regions. In this case, the second angular regions 27 are larger than the first angular regions 26. The second angular regions 27 are usually approximately twice as large as the first angular regions 26.

The present invention has many advantages. In particular, the fill factor of the stator slots 7 can be maximized. This means that, compared to a jumble winding, the torque can be increased for the same dimensioning of the electric machine 1, or the electric machine 1 can be dimensioned smaller to achieve the same torque. The pulling-in forces are considerably lower than in the prior art. Fully automated production—e.g. by means of a robot—is readily possible. Any manufacturing variance can be covered via a plurality of winding tools 13, wherein the shell lengths of the winding tools 13 and, if necessary, other dimensions of the winding tools 13 vary accordingly. A smooth wire is not absolutely necessary, since the wires of the windings 9 are not displaced relative to one another when they are pulled in, but their geometrical arrangement remains constant.

Although the invention has been illustrated and described in detail by the preferred embodiment, the invention is not limited by the examples disclosed and other variations will be apparent to persons skilled in the art without departing from the scope of protection sought for the invention.

What is claimed is:

1. A method for pulling a stator winding system of an electric machine into a stator lamination stack of the electric machine, said method comprising:
(a) configuring first and second end parts of a winding tool completely inside a shell section thereof, when viewed radially with respect to a tool axis, for guidance and displacement relative to one another by the shell section in a direction of the tool axis by a shortening section between a smaller and a greater distance from one another, with the shell section formed with tool slots for the windings, with the tool slots running parallel to the tool axis of the winding tool, disposed in a circularly distributed manner about the tool axis and closed toward the tool axis;
(b) winding windings of a number of phases of the stator winding system onto the winding tool as layer windings while the two end parts are at the greater distance from each other,
(c) during winding of the windings, holding winding overhangs of the windings radially within the shell section by guide surfaces of the end parts;
(d) guiding the windings in a transition section from sections of the windings disposed in the tool slots to the winding overhangs held by the first end part by guide elements of the first end part such that, when viewed in a tangential direction about the tool axis, the windings extend over an angle that is smaller than an angle in a region of the shell section;

(e) disposing the winding tool with the windings wound thereon in relation to the stator lamination stack such that the tool axis is aligned with an axis of rotation of the electric machine, the first end part projects into the stator lamination stack, and the tool slots are located at same positions in the radial direction and the tangential direction as those of stator slots of the stator lamination stack, into which stator slots the windings are to be inserted and which stator slots run parallel to the axis of rotation of the electric machine, are disposed in a circularly distributed manner about the axis of rotation and are open toward the axis of rotation, and which stator slots have at their end facing the axis of rotation a gap region which is tapered relative to a rest of the stator slot;

(f) displacing the first and second end parts of the winding tool in a direction of the tool axis such that the first and second end parts are first displaced relative to one another at the smaller distance from one another, and the second end part detaches from the winding overhangs wound onto the second end part, as the first and second end parts are displaced;

(g) pushing the first end part through the stator lamination stack in a direction of the axis of rotation to thereby cause the windings to be pulled into the corresponding ones of the stator slots, with the windings being located with their transition sections in the gap regions of the stator slots, and with the winding overhangs that have been detached from the second end part being guided radially outward by guide bevels, which are disposed on the shell section, and then sliding radially outward along the shell section toward the stator lamination stack;

(h) retracting, with or without moving the first and second end parts to the greater distance from one another, the first end part through the stator lamination stack;

(i) the first end part detaching from the winding overhangs wound onto the first end part before or during retraction; and (k) bending radially outward the winding overhangs detached from the first end part.

2. The method of claim 1, further comprising:

mounting the guide surfaces of the first end part of the winding tool in a base part of the first end part to enable displacement of the guide surfaces between a first position, in which the guide surfaces project axially from the base element as viewed in the direction of the tool axis, and a second position in which the guide surfaces are retracted into the base element as viewed in the direction of the tool axis; and moving the guide surfaces of the first end part from the first position to the second position after the first end part has been pushed through the stator lamination stack, thereby releasing the winding overhangs from the first end part before the first end part is retracted.

3. The method of claim 2, further comprising:

mounting sliding elements in the base element for radial displacement between a first position in which the sliding elements are retracted into the base element as viewed orthogonally to the tool axis, and a second position in which the sliding elements project radially from the base element as viewed orthogonally to the tool axis; and bending winding overhangs initially wound onto the guide surfaces of the first end part radially outward by the sliding elements.

4. The method of claim 1, wherein only the windings of a single phase of the stator winding system are wound onto the winding tool at a time, and further comprising repeatedly executing step (a) to (k) until the windings of all the phases of the stator winding system have been pulled into the stator lamination stack.

* * * * *